US007181818B1

(12) United States Patent
Qualman et al.

(10) Patent No.: US 7,181,818 B1
(45) Date of Patent: Feb. 27, 2007

(54) TOOL FOR REMOVING VALVE SPRINGS AND VALVE GUIDE SEALS FROM AN ENGINE

(76) Inventors: Richard K. Qualman, 12725 W. Courtland Ave., Butler, WI (US) 53007; Karen A. Deutscher, 12725 W. Courtland Ave., Butler, WI (US) 53007

( * ) Notice: Subject to any disclaimer, the term of this patent is extended or adjusted under 35 U.S.C. 154(b) by 113 days.

(21) Appl. No.: 10/929,265

(22) Filed: Aug. 30, 2004

(51) Int. Cl.
*B23P 19/04* (2006.01)

(52) U.S. Cl. .................................................... 29/213.1

(58) Field of Classification Search .......... 29/215–221; 254/10.5

See application file for complete search history.

(56) References Cited

U.S. PATENT DOCUMENTS

| | | | |
|---|---|---|---|
| 2,566,460 | A | 9/1951 | Mihalic |
| 3,352,002 | A | 11/1967 | Kryk |
| 3,984,909 | A | 10/1976 | Velazquez |
| 4,912,825 | A | 4/1990 | Policella |
| 5,042,128 | A | 8/1991 | Barbour |
| D377,494 | S | 1/1997 | Ewers |
| 5,689,870 | A | 11/1997 | Robey |
| 6,321,432 | B1 | 11/2001 | Przybyla |

*Primary Examiner*—Robert C. Watson

(57) ABSTRACT

A tool for removing valve springs and seals from an engine's intake and exhaust valves includes a bracket having apertures spaced therealong and for receiving fastening members therethrough. The tool further includes a plurality of support pedestals provided with channels extending therethrough and for receiving the fastening members respectively so that the bracket is maintained at a substantially stable position. The tool also includes a mechanism for simultaneously compressing a valve head keeper and releasing associated locks so that a user can remove the valve springs and valve seals from the valve head. The compressing mechanism cooperates with the pedestals and the bracket and is rotatable about a fulcrum axis traversing the pedestals wherein the fulcrum axis extends along a horizontal plane subjacent the bracket.

18 Claims, 3 Drawing Sheets

TOOL FOR REMOVING VALVE SPRINGS AND VALVE GUIDE SEALS FROM AN ENGINE

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to a component removal tool and, more particularly, to a tool for removing valve springs and valve guide seals from an engine.

2. Prior Art

An automotive engine "valve job" involves removal of the valve cover and cylinder head, followed by disassembly and removal of each valve from the cylinder head for replacement or repair.

The valves are held in place in the cylinder head, each by a compression spring acting on the valve stem to keep it tightly closed. A dish-shaped retainer centered on top of the valve spring has a frusto-conical inner ramp surface which engages a pair of frusto-conical "keepers", forcing them into positive locking engagement with the valve stem. The two keepers are halves of a split ring, together forming a frusto-conical ring to surround and engage the inner ramp of the retainer. The inner surfaces of the keepers together form one or more circumferential keys to engage corresponding circumferential keyways near the top of the valve stem. The conical inner surface of the retainer engages the conical outer surface of the keepers to force them into locking engagement with the valve stem.

To disassemble and remove a valve, it is first necessary to further compress the valve spring, move the retainer out of engagement with the keepers, remove the keepers which are now loose, remove the retainer and spring (which are now free), then slide the valve stem (which is now free) out through the underside of the cylinder head.

The procedure described above is usually performed by using a C-clamp or the like to compress the valve spring, then using one's fingers or needle nose pliers to remove the keepers. Another expedient is the use of a lever having a notch at its end to straddle the valve stem, the fulcrum of the lever being anchored to a rocker arm stud. The lever is pivoted about the rocker arm stud to thereby compress the valve spring and permit manual removal of the keepers. All of these methods, though, still require the complete removal of the engine block from the automobile and then the cylinder head from the engine block, and other time consuming preparatory procedures.

Accordingly, a need remains for a tool for removing valve springs and valve guide seals from an engine to overcome the above noted shortcomings. The present invention satisfies such a need by providing a convenient, easy to use, effective and time saving tool for valve spring removal. Such a tool takes advantage of existing bolt holes in the engine block and thus requires no removal or modification of an engine block in order to use.

BRIEF SUMMARY OF THE INVENTION

In view of the foregoing background, it is therefore an object of the present invention to provide a tool for removing valve springs and valve guide seals from an engine. These and other objects, features, and advantages of the invention are provided by a tool for allowing an operator to remove valve springs and valve seals from an engine's intake and exhaust valves without requiring the removal of the engine from a support frame.

The tool includes an arcuate bracket, preferably having a generally U-shape for extending about the engine valve head and formed from rigid material for distributing external forces away from an engine valve head. Such a bracket has a plurality of apertures spaced along a perimeter thereof, including a plurality of fastening members threadably positionable therethrough for advantageously securing the bracket adjacent the valve head.

The present invention further includes a plurality of elongated support pedestals having predetermined uniform axial lengths respectively. Such pedestals further have vertically disposed longitudinal axes and are provided with channels extending axially therethrough respectively. The pedestals are aligned and abutted with the bracket apertures for receiving the fastening members therethrough so that the bracket can conveniently be maintained at a substantially stable and elevated position during operating conditions.

The tool also includes a mechanism for simultaneously compressing a valve head keeper and releasing associated locks so that a user can readily remove the valve springs and valve seals from the valve head. Such a compressing mechanism cooperates with the pedestals and the bracket and is manually rotatable along a selected radial direction and about a fulcrum axis traversing the pedestals wherein the fulcrum axis extends along a horizontal plane subjacent the bracket.

The compressing mechanism includes an elongated anchor bolt that defines the fulcrum axis and is disposed along a substantially horizontal plane. Such a bolt has a threaded end portion and an oppositely disposed head portion extending outwardly from the bracket respectively. The bolt head portion preferably has a substantially hexagonal shape so that a user can readily rotate same by employing a conventional ratchet and socket.

The compressing mechanism further includes a plurality of fingers secured to the bolt and extending outwardly therefrom along a generally perpendicular path to the bolt. The fingers may be medially spaced along the bolt and within an inner perimeter of the bracket and terminate above a top surface of the bracket. Each such finger has an inner surface area provided with a longitudinal axis offset from a vertical plane so that the valve spring can be effectively engaged during operating conditions.

The mechanism also includes a plurality of stop members adjustably engaged with the bolt for defining a linear path along which the bolt can be positioned. One such stop member protrudes outwardly and orthogonally from the bolt and adjacent the head portion thereof. The bolt further includes an integrally disposed collar portion extending radially therefrom adjacent to the head portion. Such a collar portion is engageable with another of the stop members as the bolt is selectively positioned along the linear path.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
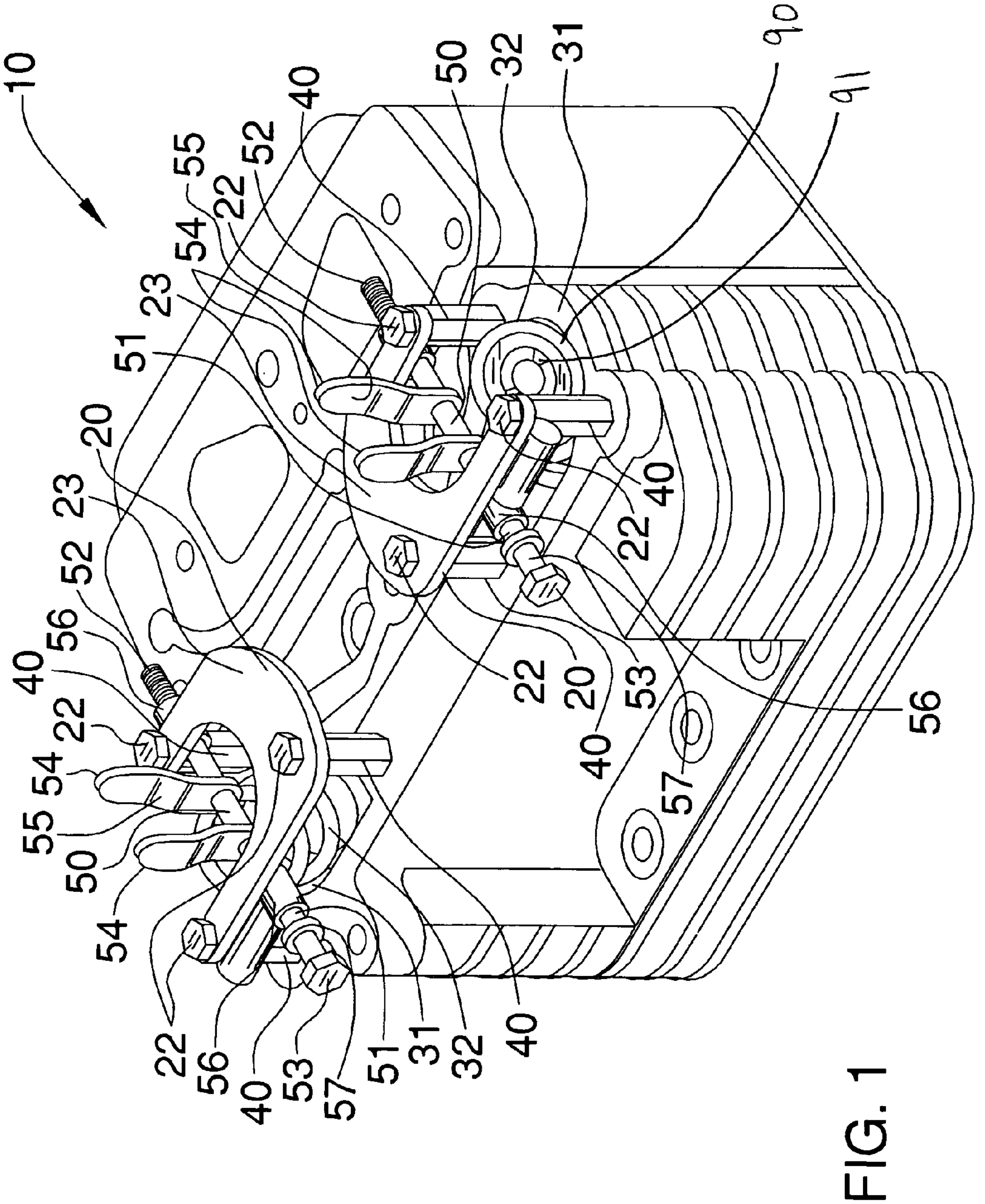
FIG. 1 is a perspective view showing a tool for removing valve springs and valve guide seals from an engine, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The tool of this invention is referred to generally in FIGS. 1–4 by the reference numeral 10 and is intended to provide a tool for removing valve springs and valve guide seals from an engine. It should be understood that the tool 10 may be used to remove valve spring and guide members on many different types of engines and should not be limited to only motorcycle engines.

Referring initially to FIG. 1, the tool 10 includes an arcuate bracket 20, having a generally U-shape for extending about the engine valve head 31 and formed from rigid material for distributing external forces away from an engine valve head 31. Such a bracket 20 has a plurality of apertures 21 spaced along a perimeter thereof, including a plurality of fastening members 22 threadably positionable therethrough for advantageously securing the bracket 20 adjacent the valve head 31.

Figure 2:
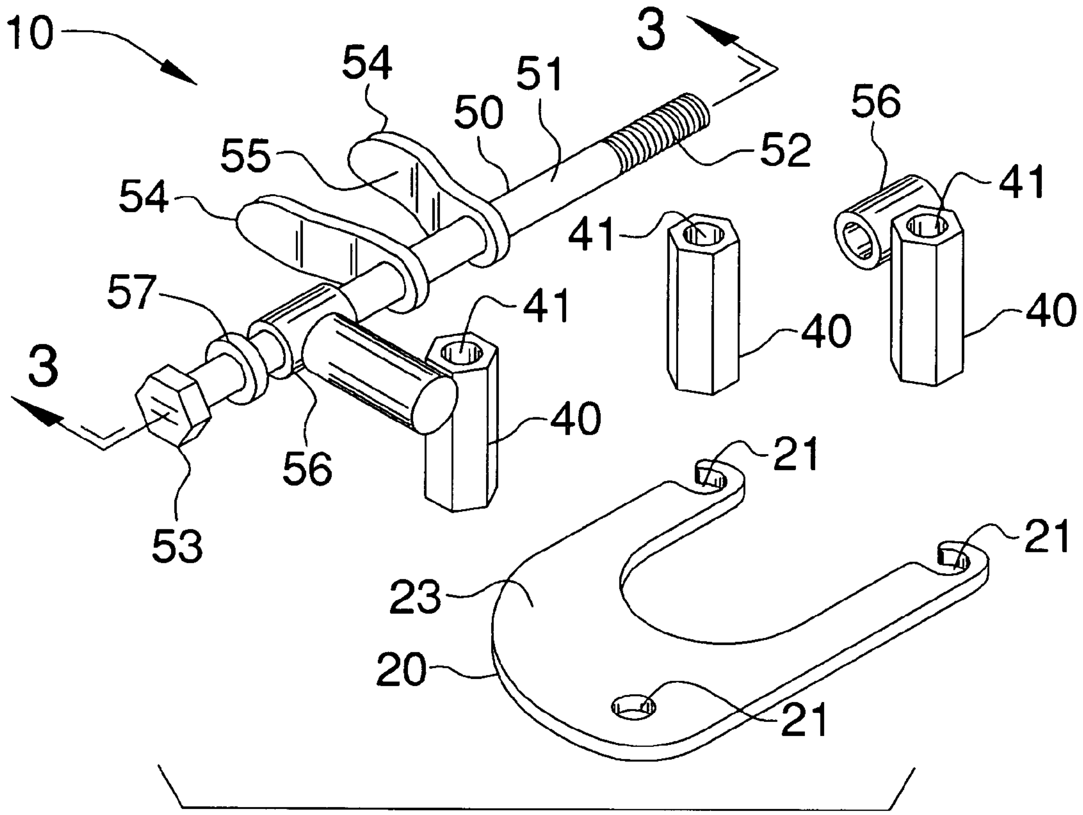
FIG. 2 is a perspective view showing the individual components of the tool in FIG. 1.
Figure 4:
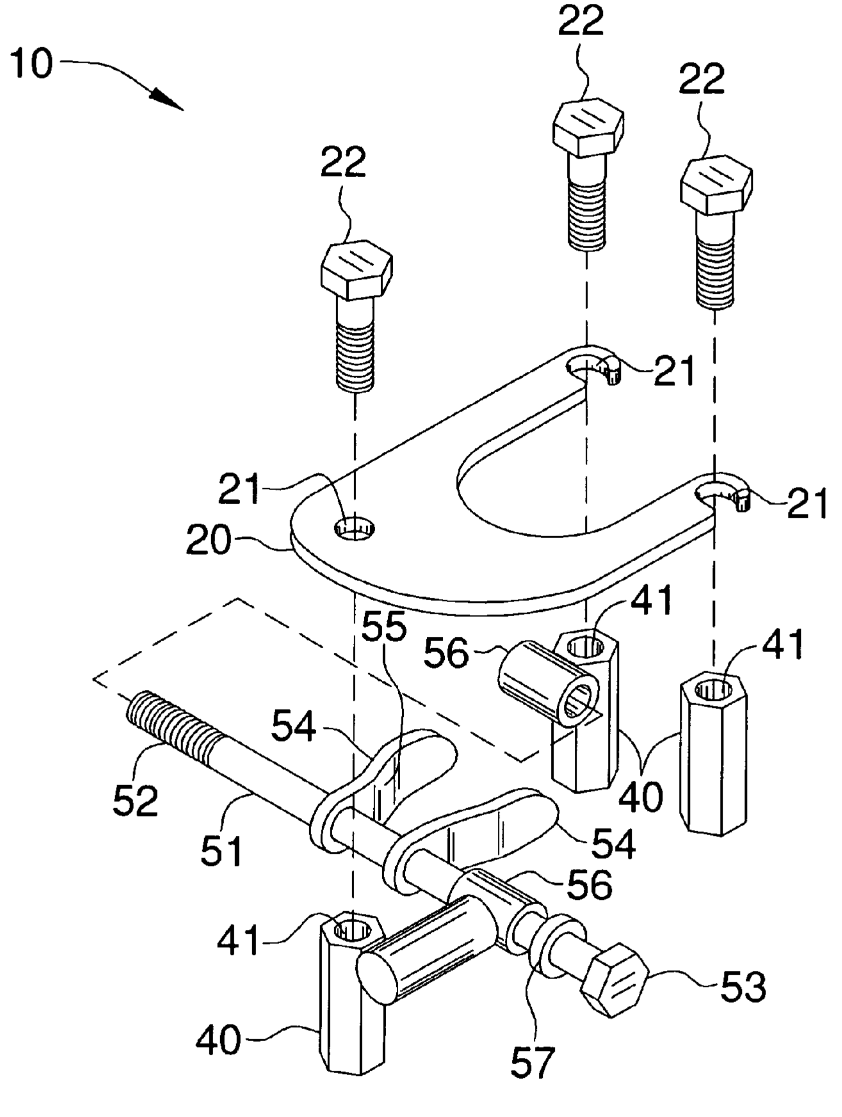
FIG. 4 is an exploded view of the tool shown in FIG. 1.

As is shown in FIGS. 2 and 4, the present invention further includes a plurality of elongated support pedestals 40 having predetermined uniform axial lengths respectively. Such pedestals 40 further have vertically disposed longitudinal axes and are provided with channels 41 extending axially therethrough respectively. The pedestals 40 are aligned and abutted with the bracket apertures 21 for receiving the fastening members 22 therethrough so that the bracket 20 can conveniently be maintained at a substantially stable and elevated position during operating conditions. Such a plurality of support pedestals 40 advantageously allows easy access to the functional parts of the tool 10 during operating conditions.

The tool 10 also includes a mechanism 50 for simultaneously compressing a valve head keeper 90 and releasing associated locks 91 so that a user can readily remove the valve springs 32 and valve seals 33 from the valve head 31. Such a compressing mechanism 50 cooperates with the pedestals 40 and the bracket 20 and is manually rotatable along a selected radial direction and about a fulcrum axis traversing the pedestals 40 wherein the fulcrum axis extends along a horizontal plane subjacent the bracket 20. The compressing mechanism 50 conveniently decreases the amount of force needed to compress the valve head keeper, allowing for easier and more rapid replacement of the valve spring 32 and seal 33.

Figure 3:
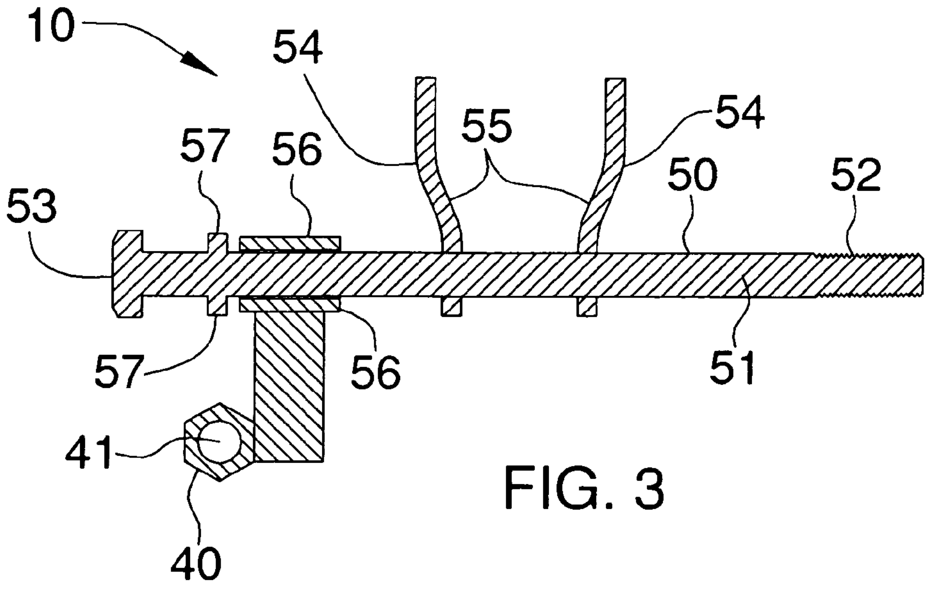
FIG. 3 is a cross-sectional view of the bolt shown in FIG. 2, taken along line 3—3.

As can be seen in FIGS. 2, 3 and 4, the compressing mechanism 50 includes an elongated anchor bolt 51 that defines the fulcrum axis and is disposed along a substantially horizontal plane. Such a bolt 51 has a threaded end portion 52 and an oppositely disposed head portion 53 extending outwardly from the bracket 20 respectively. The bolt head portion 53 has a substantially hexagonal shape so that a user can readily rotate same by employing a conventional ratchet and socket.

The compressing mechanism 50 further includes a plurality of fingers 54 secured to the bolt 51 and extending outwardly therefrom along a generally perpendicular path to the bolt 51. The fingers 54 are medially spaced along the bolt 51 and within an inner perimeter of the bracket 20 and terminate above a top surface 23 of the bracket 20. Each such finger 54 has an inner surface area 55 and a longitudinal axis offset from a vertical plane so that the valve spring 32 can be effectively engaged during operating conditions.

The mechanism 50 also includes a plurality of stop members 56 adjustably engaged with the bolt 51 for defining a linear path along which the bolt 51 can be positioned. The stop members 56 advantageously prevent the bolt 51 from becoming disengaged from the bracket 20, effectively avoiding damage to the engine valve head 31. One such stop member 56 protrudes outwardly and orthogonally from the bolt 51 and adjacent the head portion 53 thereof. The bolt 51 further includes an integrally disposed collar portion 57 extending radially therefrom adjacent to the head portion 53. Such a collar portion 57 is engageable with another of the stop members 56 as the bolt 51 is selectively positioned along the linear path.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A tool for allowing an operator to remove valve springs and valve seals from an engine's intake and exhaust valves without requiring the removal of the engine from a support frame, said tool comprising:

- a bracket formed from rigid material and for distributing external forces away from an engine valve head, said bracket having a plurality of apertures spaced along a perimeter thereof and comprising a plurality of fastening members threadably positionable therethrough for securing said bracket adjacent the valve head;
- a plurality of support pedestals having vertically disposed longitudinal axes and being provided with a channel extending axially therethrough, said pedestals for receiving said fastening members therethrough so that said bracket can be maintained at a substantially stable and elevated position during operating conditions; and means for compressing a valve head keeper and associated locks so that a user can readily remove the valve springs and valve seals from the valve head, said compressing means cooperating with said pedestals and said bracket and being manually rotatable along a selected radial direction and about a fulcrum axis traversing said pedestals.

2. The tool of claim 1, wherein said compressing means comprises:

an elongated anchor bolt defining the fulcrum axis and being disposed along a substantially horizontal plane, said bolt having a threaded end portion and an oppositely disposed head portion extending outwardly from said bracket respectively;

a plurality of fingers secured to said bolt and extending outwardly therefrom along a generally perpendicular path to said bolt, each said finger having an inner surface area provided with a longitudinal axis offset from a vertical plane so that the valve spring can be effectively engaged during operating conditions; and a plurality of stop members adjustably engaged with said bolt and for defining a linear path along which said bolt can be positioned, one said stop members protruding outwardly and orthogonally from said bolt and adjacent said head portion thereof;

wherein said fingers are rotated downwardly onto the valve spring and the valve head keeper which causes release of the associated locks, said fingers being rotatable upwardly such that the valve springs and the valve seals can be removed.

3. The tool of claim 2, wherein said bolt head portion has a substantially hexagonal shape so that a user can readily rotate same by employing a conventional ratchet and socket.

4. The tool of claim 1, wherein said bracket has a generally U-shape for extending about the engine valve head.

5. The tool of claim 2, wherein said fingers are medially spaced along said bolt and within an inner perimeter of said bracket, said fingers terminating above a top surface of said bracket.

6. The tool of claim 2, wherein said bolt further includes an integrally disposed collar portion extending radially therefrom adjacent said head portion, said collar portion being engageable with another said stop members as said bolt is selectively positioned along the linear path.

7. A tool for allowing an operator to remove valve springs and valve seals from an engine's intake and exhaust valves without requiring the removal of the engine from a support frame, said tool comprising:

an arcuate bracket formed from rigid material and for distributing external forces away from an engine valve head, said bracket having a plurality of apertures spaced along a perimeter thereof and comprising a plurality of fastening members threadably positionable therethrough for securing said bracket adjacent the valve head;

a plurality of elongated support pedestals having vertically disposed longitudinal axes and being provided with threaded channels extending axially therethrough respectively, said pedestals being aligned and abutted with the bracket apertures for receiving said fastening members therethrough so that said bracket can be maintained at a substantially stable and elevated position during operating conditions; and means for compressing a valve head keeper and associated locks so that a user can readily remove the valve springs and valve seals from the valve head, said compressing means cooperating with said pedestals and said bracket and being manually rotatable along a selected radial direction and about a fulcrum axis traversing said pedestals.

8. The tool of claim 7, wherein said compressing means comprises:

an elongated anchor bolt defining the fulcrum axis and being disposed along a substantially horizontal plane, said bolt having a threaded end portion and an oppositely disposed head portion extending outwardly from said bracket respectively;

a plurality of fingers secured to said bolt and extending outwardly therefrom along a generally perpendicular path to said bolt, each said finger having an inner surface area provided with a longitudinal axis offset from a vertical plane so that the valve spring can be effectively engaged during operating conditions; and a plurality of stop members adjustably engaged with said bolt and for defining a linear path along which said bolt can be positioned, one said stop members protruding outwardly and orthogonally from said bolt and adjacent said head portion thereof.

9. The tool of claim 8, wherein said bolt head portion has a substantially hexagonal shape so that a user can readily rotate same by employing a conventional ratchet and socket.

10. The tool of claim 7, wherein said bracket has a generally U-shape for extending about the engine valve head.

11. The tool of claim 8, wherein said fingers are medially spaced along said bolt and within an inner perimeter of said bracket, said fingers terminating above a top surface of said bracket.

12. The tool of claim 8, wherein said bolt further includes an integrally disposed collar portion extending radially therefrom adjacent said head portion, said collar portion being engageable with another said stop members as said bolt is selectively positioned along the linear path.

13. A tool for allowing an operator to remove valve springs and valve seals from an engine's intake and exhaust valves without requiring the removal of the engine from a support frame, said tool comprising:

an arcuate bracket formed from rigid material and for distributing external forces away from an engine valve head, said bracket having a plurality of apertures spaced along a perimeter thereof and comprising a plurality of fastening members threadably positionable therethrough for securing said bracket adjacent the valve head;

a plurality of elongated support pedestals having predetermined uniform axial lengths respectively, said pedestals further having vertically disposed longitudinal axes and being provided with channels extending axially therethrough respectively, said pedestals being aligned and abutted with the bracket apertures for receiving said fastening members therethrough so that said bracket can be maintained at a substantially stable and elevated position during operating conditions; and means for simultaneously compressing a valve head keeper and releasing associated locks so that a user can readily remove the valve springs and valve seals from the valve head, said compressing means cooperating with said pedestals and said bracket and being manually rotatable along a selected radial direction and about a fulcrum axis traversing said pedestals wherein the fulcrum axis extends along a horizontal plane subjacent said bracket.

14. The tool of claim 13, wherein said compressing means comprises:

an elongated anchor bolt defining the fulcrum axis and being disposed along a substantially horizontal plane, said bolt having a threaded end portion and an oppositely disposed head portion extending outwardly from said bracket respectively;

a plurality of fingers secured to said bolt and extending outwardly therefrom along a generally perpendicular path to said bolt, each said finger having an inner surface area provided with a longitudinal axis offset from a vertical plane so that the valve spring can be effectively engaged during operating conditions; and a plurality of stop members adjustably engaged with said bolt and for defining a linear path along which said bolt can be positioned, one said stop members protruding outwardly and orthogonally from said bolt and adjacent said head portion thereof.

15. The tool of claim 14, wherein said bolt head portion has a substantially hexagonal shape so that a user can readily rotate same by employing a conventional ratchet and socket.

16. The tool of claim 13, wherein said bracket has a generally U-shape for extending about the engine valve head.

17. The tool of claim 14, wherein said fingers are medially spaced along said bolt and within an inner perimeter of said bracket, said fingers terminating above a top surface of said bracket.

18. The tool of claim 14, wherein said bolt further includes an integrally disposed collar portion extending radially therefrom adjacent said head portion, said collar portion being engageable with another said stop members as said bolt is selectively positioned along the linear path.

* * * * *